June 9, 1931.  H. J. CRINER  1,809,112
ELECTRIC BREAD TOASTER
Filed April 2, 1927   2 Sheets-Sheet 1

Harry J. Criner INVENTOR

BY

Curtis Bush ATTORNEY

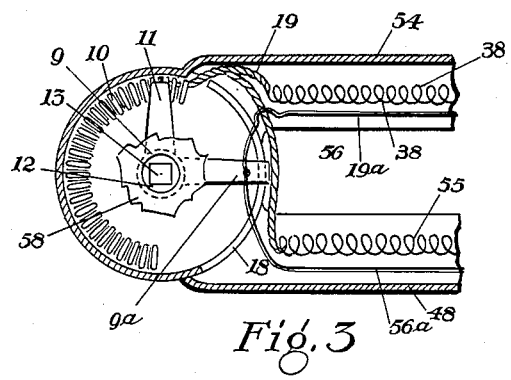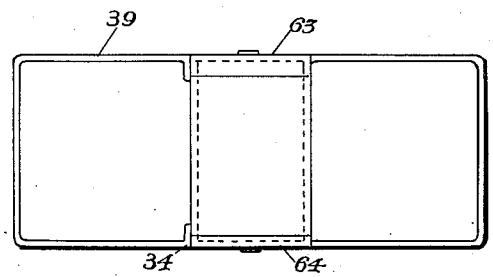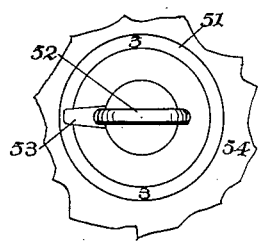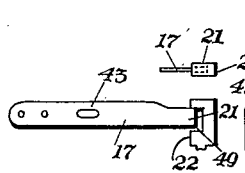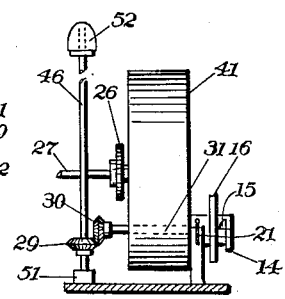

Patented June 9, 1931

1,809,112

UNITED STATES PATENT OFFICE

HARRY J. CRINER, OF BURLINGTON, IOWA

ELECTRIC BREAD TOASTER

Application filed April 2, 1927. Serial No. 180,555.

My invention relates to improvements in electric bread toasters.

The objects of my invention are:

To provide a toaster in which the bread can be toasted with full application of heat for a predetermined length of time and the heat can then be automatically cut down sufficiently to avoid burning the bread, at the same time keeping sufficient heat applied to keep the toast from cooling;

To provide a bread toaster in which the heating elements can be automatically or manually spread apart without cutting off the current and the toasted bread held in an intermediate position between them so as to keep warm without burning;

To provide a toaster in which the heating elements and the toast can be automatically or manually separated and the current cut down in the heating elements sufficiently to prevent burning the toast in such separated position, and To provide a simple, economically constructed and easily operated bread toaster.

I attain these objects by the means illustrated in the accompanying drawings, in which,—

Figure 1:
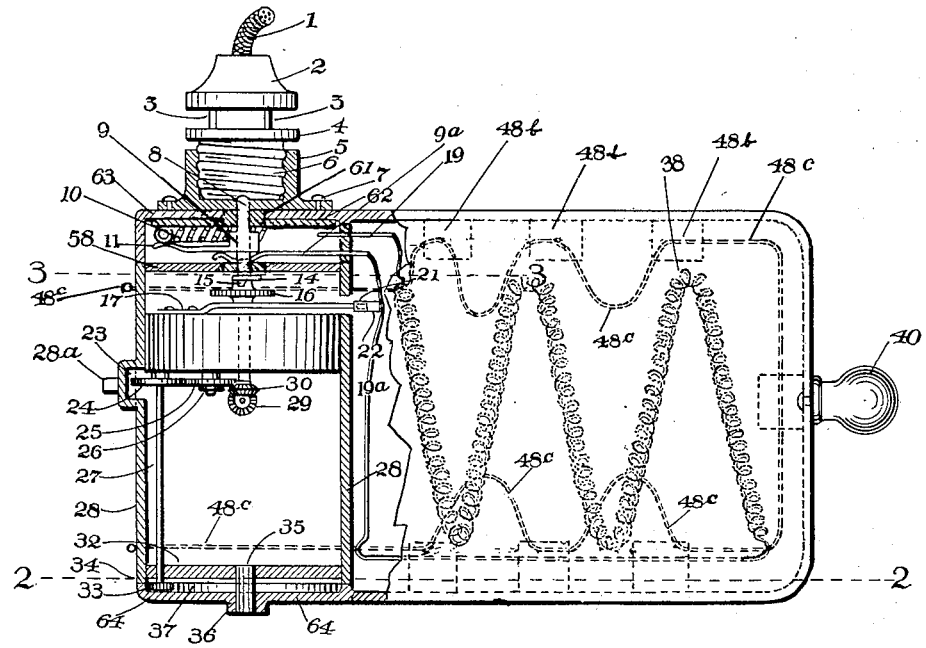
Figure 2:
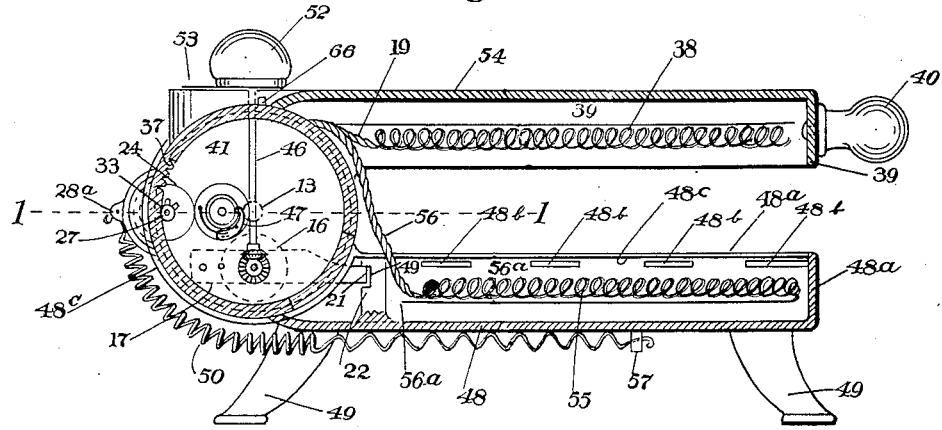

Figure 1 is a top or plan view of my device, but showing the operating mechanism in section on the line 1—1 of Figure 2; Fig. 2 is a sectional elevation on the line 2—2 of Figure 1; Fig. 3 is a detail in section on the line 3—3 of Figure 1; but showing the insulating head, 58, broken away to disclose the rheostat coil; Fig. 4 is a reduced plan view showing the base and upper housing in wide-open position to illustrate more clearly the manner in which they are connected. In the operation of my device I do not contemplate throwing the upper housing much beyond the vertical position in opening up the toaster. Figure 5 is a detail showing the timer setting, handle, pointer and dial; Fig. 6 shows details of the timing release spring lever and detent; Fig. 7 is a detail of the timing mechanism with the control shaft, 46, and the operating shaft, 27, broken away.

My apparatus comprises a base-plate, 48, supported by a plurality of legs, 49. The base-plate, 48, is cast integral with side and front flanges, 48a, and with circular heads, 63 and 64 cast integral at the rear thereof.

The upper housing comprises a plate, 54, with front and side flanges, 39, formed integral therewith. A cylinder, 28, is formed integral with the upper plate, 54, and flanges, 39, of a length sufficient to fit between the heads, 63 and 64, of the base. The heads, 32 and 58, are mounted within the cylinder, 28, the head, 32, being pivoted upon a pivot, 35, secured in a boss, 36, formed integral with the head, 64.

The other end of the cylinder, 28, has a head, 58, of insulating material secured therein with a square opening adapted to receive the head of a shaft, 13. The outer end, 8, of the shaft, 13, is rounded and extends into a bushing, 61, which is secured by a press-fit in the center of the head, 63, and extends through the head, 63, to form an electrical contact point as will be hereinafter described. A resistance coil, 10, is secured upon an insulating plate, 62, mounted within the head, 63, which is formed in cup-shape to provide a recess for the resistance coil, 10, and parts adjacent thereto. A contact arm, 11, is secured to a hub, 9, which in turn is mounted upon the square shaft, 13.

The socket, 5, is secured to the outer face of the head, 63, by rivets, 7, or other suitable means, and is adapted to receive a screw plug, 4, which in turn has openings to receive the terminals, 3, of the electric wires, 1, which enter the plug, 2, adjacent the terminals. The return end of the resistance coil, 10, is connected by wires, 19, with one end of the upper heating element, 38, and wires, 56, with one end of the lower heating element, 55, while the opposite ends of the heating elements are connected by wires, 19a and 56a, respectively to the hub, 9, of the rheostat. Any desired form of connection may be used, but I prefer to use a thin copper plate 9a, having one end resting upon the hub, 9, and its opposite end extending through the flange or cup portion of the head, 63.

For a timing mechanism I prefer to use the ordinary clock setting device as these are in common use or manufactured in large quantities and can be obtained very cheaply.

I operate the rheostat by the movement of the upper housing which is actuated by the tension spring, 50, one end of which is secured to a lug, 57, formed integral with the base, 48, and the other end of which is secured to a lug, 28a, formed integral with the cylinder, 28. I provide a catch, 22, which is formed integral with the base, 48, the upper end of which is beveled as shown at 45 in Figure 6, and which has a notch, 49, in the rear face thereof. The outer end, 21, of the release lever spring, 17, is adapted to latch within the notch, 49, of the catch, 22, when the upper housing is in the position shown in Figure 2.

The spring release lever, 17, is riveted to the housing of the timing mechanism and is provided with an opening 43 at the middle portion thereof through which the shaft, 31, of the timing mechanism passes. A releasing dog, 14, (Fig. 7) is secured upon the outer end of the shaft, 31, adjacent the timing wheel, 16, which is operated by the clock gears in a well known manner that need not be described.

A recess, 15, is provided in the hub of the timing wheel, 16, in which the finger of the dog, 14, may enter when in juxtaposition and the lever, 17, being formed of spring material, constantly presses the hub of the wheel, 16, against the dog, 14.

The dog, 14, may be set in any desired position by means of the shaft, 31, and bevel gears, 30 and 29, the bevel gear, 30, being mounted upon the inner end of the shaft, 31, and the bevel gear, 29, being mounted upon the lower end of the setting shaft, 46, upon the upper end of which a wing or knob, 52, is secured, having secured thereto a pointer, 53, which moves around a dial, 51.

The electric current may be turned on by the ordinary switch in the supply line, which switches are now in common use and need not be described here.

In toasting bread with my device the bread may be laid upon the lugs, 48b, formed integral with the flanges, 48a, of the base, but I prefer to allow the bread to rest upon a simple wire loop, 48c, which in turn has its free portion adapted to rest upon the lugs, 48b, and which has curved ends adapted to embrace the cylinder, 28, of the movable member, 54.

Lugs, 66, (Fig. 2) are formed upon the cylinder, 28, spaced apart from the ends of the wire, 48c, when the toaster is in closed position and at such a distance that the movable member, 54, will be raised about half way to the vertical before the lugs, 66, come in contact with the ends of the wire, 48c.

During the remainder of the upward movement of the member, 54, the lugs, 66, carry the wires, 48c, so as to raise the bread to a position about half way between the two heating elements. When in this position, with the heat cut down by the rheostat, the bread will not burn, but will be kept warm. It is obvious that when the movable member has been turned into its vertical position, it will readily attract the attention of the person operating the toaster and thus act as a signal to indicate when the toast is ready for use. It is obvious that the form and proportions and even the operation of this device may be varied to a considerable extent without departing from the spirit of my invention and I do not limit my claims to the precise construction illustrated in the drawings, but desire them to be understood as covering all equivalent constructions within the proper range of equivalents in this particular art.

In the operation of my device, assuming the toaster to be in open position, the slice of bread to be toasted is laid upon inwardly extending lugs, 48b, formed integral with the flanges, 48a, or other suitable support. The upper housing is then lowered to the position shown in Figure 2 and is held in this position by the tension of the head of the spring lever, 17, in the notch, 49, of the catch, 22. The terminals, 3, may then be inserted in the plug, 4, and the electric current turned on in the supply line. The current will then flow through the upper and lower heating elements, 38 and 55, and the control knob or wing, 52, may be turned to set the timing device for the desired period of time. On the dial shown, each of the divisions is intended to represent three minutes of time, that being about the average time taken for toasting a slice of bread, but the pointer may be turned to indicate more or less time as desired.

At the lapse of the specified time, the timing wheel, 16, has been driven to a point where the notch, 15, registers with the finger of the dog, 14, and allows the head, 21, of the spring to fly out from under the detent, 22. This allows the spring, 50, to exert tension upon the upper housing and draw it around to or beyond the vertical position as desired. The distance to which the upper housing may be turned may be governed by a stop or detent of any kind desired, or by varying the length and tension of the spring, 50.

The bread to be toasted may be laid upon the lugs, 48b, and the wire support, 48c, dispensed with or the bread may be laid upon the wire support, 48c, in which case it will be carried upwardly away from the lower heating element, preferably about half the distance that the upper heating element travels.

As the ends of the wire support, 48c, encircle the cylinder, 28, it is obvious that the wire support, 48c, when elevated by the lifting of the member 54 and the action of the lugs 66 will travel through a portion of the path of travel of the upper housing plate, 54, as if concentrically mounted upon the same pivot or shaft. In other words the wire bread support, 48c, is concentrically mounted with the upper housing plate, 54. This construction pivots the bread support, 48c, concentrically with the heating elements.

I claim:

1. In an electric toaster, the combination with a pair of heating elements, of a support for holding a slice of bread between them, said heating elements and support being concentrically, pivotally united and spring-actuated means for automatically separating the heating elements from each other and from the bread support.

2. In an electric toaster, the combination with a fixed heating element, of a movable heating element, a bread support interposed between the heating elements, and spring-actuated means for automatically moving the movable heating element away from the bread and the bread away from the fixed heating element and for holding the toasted bread at a predetermined distance from both heating elements, when in open position, where it can be kept warm without burning.

3. An electric toaster, comprising a base containing a fixed heating element, a movable housing pivotally connected to the base and containing a movable heating element, a bread support secured between the heating elements and pivotally mounted concentrically therewith, a lost-motion connection between the movable heating elements and the bread support, a tension spring having one end secured to the base and its opposite end secured to an extension of the movable upper housing, a latch secured to the movable housing, a detent secured to the base, and means for automatically releasing the latch after a predetermined interval.

4. An electric toaster, comprising a base containing a fixed heating element, a movable housing pivotally connected to the base and containing a movable heating element, a bread support secured between the heating elements, a tension spring having one end secured to the base and its opposite end secured to an extension of the movable upper housing, a latch secured to the movable housing, a detent secured to the base, a timing mechanism connected to the latch and adapted to release same after a pre-determined interval, a rheostat in series with both of the heating elements and having its operating arm connected to and movable by the movable housing, and wire connections for connecting the rheostat to a source of electric current supply.

5. An electric toaster, comprising a base containing a fixed heating element, a movable housing pivotally connected to the base and containing a movable heating element, a hinged bread support between the heating elements, a lost-motion connection between the bread support and the movable housing, a tension spring having one end secured to the base and its opposite end secured to an extension of the movable upper housing, a latch secured to the movable housing, a detent secured to the base, and means for automatrically releasing the latch after a pre-determined interval.

6. An electric toaster, comprising a base containing a fixed heating element, a movable housing pivotally connected to the base and containing a movable heating element, a hinged bread support secured between the heating elements, a lost-motion connection between the bread support and the movable housing, a tension spring having one end secured to the base and its opposite end secured to an extension of the movable upper housing, a latch secured to the movable housing, a detent secured to the base, a timing mechanism connected to the latch and adapted to release same after a pre-determined interval, a rheostat in series with both of the heating elements and having its operating arm connected to and movable by the movable housing, and wiring connections for connecting the rheostat to a source of electric current supply.

7. A pair of pivotally connected housings each containing a heating element, a bread support interposed between the heating elements, a tension spring connecting the housings adapted to draw the heating elements apart, a latch secured to one of the housings, a detent united to the other housing, a timing mechanism connected to the latch and adapted to release same after a pre-determined interval, a rheostat in series with both heating elements and having its operating arm connected to one of the housings, and wiring connections for connecting the rheostat to a source of electric current supply.

8. A pair of housings each containing a heating element, a rheostat in series with the heating elements and operable through intermediate connections by a spring, a detent and latch secured to the spring connections, and a timing mechanism connected to the latch and adapted to release same from the detent after a pre-determined interval.

9. An electric toaster, comprising a base containing a fixed heating element, a movable housing pivotally connected to the base and containing a movable heating element, a hinged bread support secured between the heating elements, a lost-motion connection between the bread support and the movable housing, a tension spring having one end secured to the base and its opposite end secured to an extension of the movable upper housing, a latch secured to the movable housing, a detent secured to the base, a timing mechanism connected to the latch and adapted to release same after a pre-determined interval, a rheostat in series with the fixed heating element and having its operating arm connected to and movable by the movable housing, and wiring connections for connecting the rheostat to a source of electric current supply.

10. An electric toaster, comprising a base containing a fixed heating element, a movable housing pivotally connected to the base and containing a movable heating element, a hinged bread support secured between the heating elements, a lost-motion connection between the bread support and the movable housing, a tension spring having one end secured to the base and its opposite end secured to an extension of the movable upper housing, a latch secured to the movable housing, a detent secured to the base, a timing mechanism connected to the latch and adapted to release same after a pre-determined interval, a rheostat in series with the movable heating element and having its operating arm connected to and movable by the movable housing, and wiring connections for connecting the rheostat to a source of electric current supply.

In testimony whereof he affixes his signature.

HARRY J. CRINER.